United States Patent [19]

Kearney et al.

[11] Patent Number: 5,102,553

[45] Date of Patent: Apr. 7, 1992

[54] TIME VARIABLE SIMULATED MOVING BED PROCESS

[75] Inventors: Michael M. Kearney; Kathleen L. Hieb, both of Twin Falls, Id.

[73] Assignee: The Amalgamated Sugar Company, Ogden, Utah

[21] Appl. No.: 678,582

[22] Filed: Apr. 1, 1991

Related U.S. Application Data

[63] Continuation-in-part of Ser. No. 447,673, Dec. 8, 1989, abandoned, which is a continuation-in-part of Ser. No. 412,417, Sep. 26, 1989, Pat. No. 4,990,259, which is a continuation-in-part of Ser. No. 285,717, Dec. 16, 1988, abandoned.

[51] Int. Cl.$^5$ .............................................. B01D 15/08
[52] U.S. Cl. ...................................... 210/659; 210/662; 210/198.2; 127/46.2
[58] Field of Search ............... 210/635, 659, 656, 662, 210/670, 673, 96.1, 137, 143, 198.2, 264; 127/46.1, 46.2, 46.3

[56] References Cited

U.S. PATENT DOCUMENTS

| | | | |
|---|---|---|---|
| 2,985,589 | 5/1961 | Broughton et al. | 210/34 |
| 3,268,605 | 8/1966 | Boyd | 210/662 |
| 3,831,755 | 8/1974 | Goodman et al. | 210/108 |
| 4,001,113 | 1/1977 | Schoenrock et al. | 210/275 |
| 4,182,633 | 1/1980 | Ishikawa et al. | 210/198.2 |
| 4,247,636 | 1/1981 | Schoenrock et al. | 435/94 |
| 4,293,346 | 10/1981 | Landis et al. | 210/673 |
| 4,319,929 | 3/1982 | Fickel | 210/692 |
| 4,379,751 | 4/1983 | Yoritomi et al. | 210/659 |
| 4,400,278 | 8/1983 | Martinola | 210/678 |
| 4,402,832 | 9/1983 | Gerhold | 210/659 |
| 4,404,037 | 9/1983 | Broughton | 127/55 |
| 4,412,866 | 11/1983 | Schoenrock et al. | 210/656 |
| 4,422,942 | 12/1983 | Allington | 210/659 |
| 4,478,721 | 10/1984 | Gerhold | 210/659 |
| 4,498,991 | 2/1985 | Oroskar | 210/659 |
| 4,501,814 | 2/1985 | Schoenrock et al. | 435/94 |
| 4,511,476 | 4/1985 | Schoenrock | 210/678 |
| 4,724,081 | 2/1988 | Kawahara et al. | 210/198.2 |
| 4,840,730 | 6/1989 | Saxena | 210/659 |

*Primary Examiner*—Ernest G. Therkorn
*Attorney, Agent, or Firm*—Trask, Britt & Rossa

[57] ABSTRACT

The flow rates through the individual compartments of the sorbent bed of a simulated moving bed are controlled in accordance with time variable functions in each step to maintain an improved steady state waveform for the process.

22 Claims, 4 Drawing Sheets

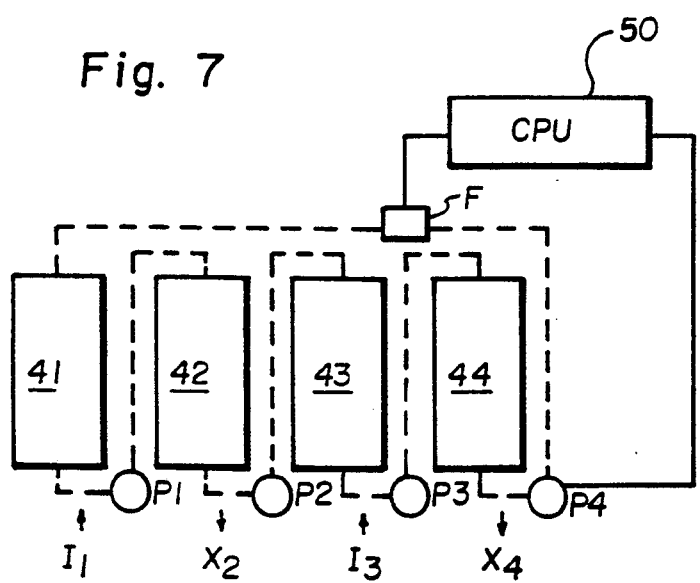

TIME VARIABLE SIMULATED MOVING BED PROCESS

RELATED APPLICATIONS

This application is a continuation-in-part of commonly assigned, U.S. patent application Ser. No. 447,673, filed Dec. 8, 1989, now abandoned, which was a continuation-in-part of commonly assigned, U.S. patent application Ser. No. 412,417, filed Sept. 26, 1989, now U.S. Pat. No. 4,990,259, which was a continuation-in-part of commonly assigned, U.S. patent application Ser. No. 285,717, filed Dec. 16, 1988, now abandoned.

The original parent application disclosed a bed packing technique used for chromatographic separation systems generally. The subsequent parent application disclosed a specific modification of that technique applied to a simulated moving bed process. This application is directed to a control procedure responsive to the waveforms and moving fronts disclosed by the parent application.

BACKGROUND OF THE INVENTION

1. Field

This invention relates to simulated moving bed chromatographic separators. It is particularly directed to a process control procedure which improves the separation characteristics of a simulated moving bed.

2. State of the Art

Batch, continuous or simulated moving bed systems designed for the chromatographic separation of mixture components often consist of one or more beds of solid separator medium (sorbent). Sorbent bed systems representative of the types contemplated by this invention are disclosed in U.S. Pat. Nos. 2,985,589; 3,831,755; 4,400,278; 4,404,037; 4,011,113; 4,182,633; 4,247,636; 4,412,866; 4,501,814; and 4,511,476, the disclosures of which are incorporated by reference for their teachings concerning sorbent beds generally and the use of such beds in industrial scale operations.

Simulated moving bed (SMB) technology is well developed for applications involving separating the components of a fluid Typical applications of simulated moving bed chromatography include the separation of fructose from fructose-glucose solutions and the separation of sucrose from sugar beet or sugar cane syrups. Ion exchange resins are typically employed as sorbents for these applications. Solution components are differentially absorbed by the ion exchange resin so that a separation waveform develops within the simulated moving bed.

A typical simulated moving bed apparatus consists of several compartments (or individual columns) filled with solid sorbent. A fluid conduit interconnects the upstream and downstream ends of the system to form a loop through which fluid is continuously recirculated. The constant flow of fluid through the loop is called "internal recirculation flow." A manifold system of pipes and valves is provided selectively to position an inlet for feed material, an inlet for desorbent, an outlet for a sorbed component and an outlet for a nonsorbed (or less sorbed) component. Each inlet and outlet communicates with a separate bed compartment. Feed material enters the system at a designated compartment and is moved through the sorbent by the continuous internal recirculation flow. This moving contact results in a chromatographic separation of components. Sorbed component(s) which flow(s) at a relatively slow rate is removed from the sorbed component outlet. Nonsorbed component(s) which flow(s) at a relatively fast rate is removed from the nonsorbed component outlet. Desorbent is added at its inlet valve between the respective outlet valve positions of the sorbed and nonsorbed components.

At predetermined time intervals (step time) the designated inlet and outlet valve positions are displaced downstream one position on the manifold to the next sorbent bed compartment, which may be a discrete section of a vessel, (such as a column), or an individual such vessel, e.g., column. The step time is chosen such that the designation of valves is properly synchronized with the internal recirculation flow. Under these conditions the system eventually reaches a steady state with specific product characteristics appearing at predetermined intervals in sequence at each valve position. This type of system simulates valves held in a single position while the solid sorbent moves at a constant and continuous rate around the recirculation loop producing constant quality product at each valve.

The simulated version more closely approaches the character of an actual moving bed system as the number of compartments and valve positions increase. An important distinction between batch and simulated moving bed systems is that the internal recirculation flow is continuous in the simulated moving bed process. Except for very small adjustments to control internal pressure, the entering and exiting flow rates are continuous and constant, thereby approximating an actual moving bed system as closely as possible.

An equilibrated SMB system of the type disclosed by the aforementioned parent applications exhibits a steady state component separation waveform along the path of the recirculation loop. This waveform moves along the path of the recirculation loop with valve switching synchronized to maintain the desired steady state.

SUMMARY OF THE INVENTION

According to this invention, the flow rates through the various individual sorbent compartments of a simulated chromatographic moving bed system are controlled to modify the specific steady state waveform characteristics of the process. These modifications differentiate the process of this invention from conventional SMB processes The steady state waveform is modified by any combination of:

(1) Operating the recirculation flow rates in a non-constant manner as a function of time within a given compartment or column during a step, (2) Operating inlet flows in a non-constant manner as a function of time during a step, and/or (3) Operating outlet flows in a non-constant manner as a function of time during a step.

The resulting process may be regarded as a "Time Variable Simulated Moving Bed" process (TVSMB). Controlling such a process requires special procedures. Highly responsive computer interaction monitoring and flow control devices are preferred. It is recognized, however, that the benefits of this invention could be realized to some extent through the use of manual control procedures.

The claimed process involves the recognition that during any given step in a SMB process, the optimum flow rates in the system are time variable The basic recirculation flow rate for any SMB process; e.g., the separation of fructose from a fructose-glucose solution, may be expressed as a function of time, B(t), where t elapses from t=0 to t=T. The mathematical expression of this function may be derived from theoretical and/or empirical considerations, and it may be optimized through experience. In any event, B(t) may be either graphically or mathematically expressed and may be encoded in conventional fashion in a microprocessor or other mechanical, electrical, or electromechanical controller. This controller can be interfaced with one or more variable speed pumps or comparable flow control devices to maintain the desired recirculation flow rate at each instant of elapsed time during a step. When the valve positions are changed (at t=T) to initiate a subsequent step, the B(t) function is reinitiated at t=0.

Thus, the recirculation flow in the first bed compartment between t=0 and t=T follows a time-variable function rather than consisting of a constant flow rate as in the prior art.

Likewise, as the valve positions are advanced through each step, the time-variable flow rate function is repeated in each successive compartment or column.

The desired flow rate function may be determined empirically, for example, by the simple measure of testing several functions and using the results and known SMB theory to determine the variable rate function for achieving the desired end, or ends, i.e., increase production rate, increase component recovery, and/or increase component stream purity.

Considering the basic flow rate B(t) to be the internal circulation rate for the first bed compartment in the system, the internal flow rates for the subsequent compartments may be derived from B(t) by adding subsequent inlet flow rates and subtracting subsequent outlet flow rates. According to certain embodiments of the invention, the circulation flow rate is monitored at a fixed location in the loop. Adjustments are made to the flow control devices in the loop, either continuously or periodically, in response to the flow rate detected at the monitor location. Thus, inlet and/or outlet flow rates and/or recirculation flow rates are controlled to vary in a predetermined manner. These rate adjustments are made to bring the actual flow rates detected at specific instants of the step into harmony with the circulation rate predicted or desired at the monitoring location at each instant of time elapsed during the specific step (of the sequence of steps constituting a process cycle) in progress.

In summary, the SMB may be operated by controlling the recirculation pump means by vary the recirculation rate throughout the system. In another embodiment, an inlet flow rate (or rates) and/or an outlet flow rate (or rates) may be varied to achieve the desired variable flow pattern(s). A system mass balance requires that the net inlet flow rate(s) must be equal to the net outlet flow rate(s) at all times. This may be achieved, for example, by varying two inlet (or outlet) flow rates in equal but opposite directions. Alternatively, an inlet flow rate and an outlet flow rate are varied equally. Different combinations of these variations may be shown to yield the desired improvement in yield, production rate or stream purity.

BRIEF DESCRIPTION OF THE DRAWINGS

In the drawings, which illustrate what is presently regarded as the best mode for carrying out the invention:

FIG. 7 is a schematic diagram of a pilot plant configured for step 1 of a specific embodiment of the invention.

DESCRIPTION OF THE ILLUSTRATED EMBODIMENTS

Figure 1:
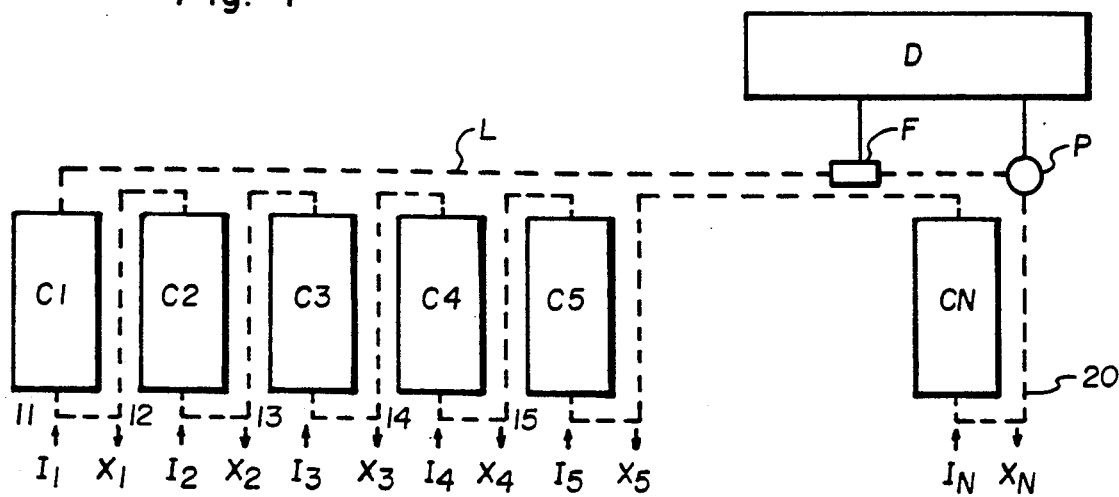
FIG. 1 is a generalized schematic diagram configured to illustrate the first step of a typical process of the invention.

FIG. 1 illustrates a process configuration consisting of N compartments, columns or separating sections C (a separating section may consist of one or more compartments) interconnected to form a recirculation loop L with recirculation flow measured by flowmeter F between column CN and Column C1. (The individual columns are nu sequentially in the direction of flow, C1 through CN). Recirculation flow is maintained by one or more pumps P placed in the recirculation loop L. With the compartments C numbered as illustrated, the process is regarded as operating in Step 1 of the process cycle. Inlet valves I and outlet valves X are oriented on each pipe 11, 12, 13, 14, 15, 20 of the loop L interconnecting compartments C. For Step No. 1 a basic recirculation flow rate function B(t) is specified for column C1. That is, the flow rate $R_1(t)$ through column C1 during step 1 is a function of time specified as B(t) where "t" is the elapsed time, 0 to T, into step 1 (the first valving position). Required internal recirculation rates for all other columns in step 1 are determined by adding subsequent inlet functions and subtracting subsequent outlet functions.

$R_1(t) = B(t)$ $R_2(t) = R_1(t) + I_1(t) - X_1(t)$ $R_3(t) = R_2(t) + I_2(t) - X_2(t)$ $R_4(t) = R_3(t) + I_3(t) - X_3(t)$ $R_5(t) = R_4(t) + I_4(t) - X_4(t)$ $R_N(t) = R_{N-1}(t) + I_{N-1}(t) - X_{N-1}(t)$

The subscripts applied to the functions I(t) and X(t) designate the inlet I and outlet X positions illustrated by FIG. 1.

At each instant (t):

$$\sum_1^N I_N(t) = \sum_1^N X_N(t)$$

That is, the sum of inlet flows should always approximate the sum of outlet flows.

Figure 2:
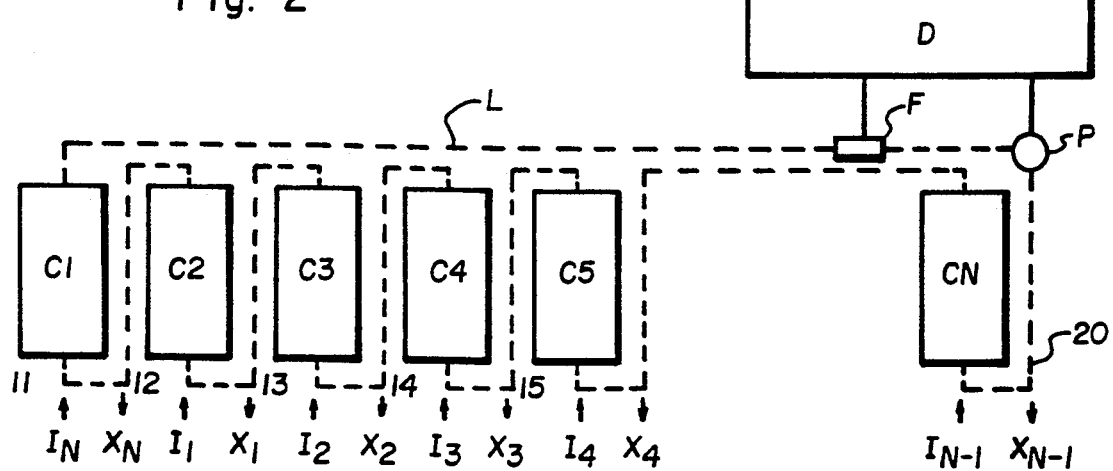
FIG. 2 is a diagram similar to FIG. 1 but configured to illustrate a subsequent process step.

As in the case of a conventional SMB process, the function of the inlets I and outlets X (the valve positions) are displaced one position downstream to commence Step 2 after a step time T has elapsed during step 1. FIG. 2 illustrates the system of FIG. 1 with the valve functions shifted as appropriate for step 2. The recirculation flow rates for the respective columns are appropriately shifted. The appropriate time variable rate which should be monitored by the flowmeter F during step 2 is $R_2(t)$. It is apparent that in subsequent steps, 3 through N, the monitored time variable flow rate at flowmeter F should progress sequentially through each of the rates $R_3(t)$ through $R_N(t)$ as follows:

| Valve Position Step | Flow Rate Setpoint at Flowmeter F |
| --- | --- |
| 1 | $R_1(t)$ |
| 2 | $R_2(t)$ |
| 3 | $R_3(t)$ |
| 4 | $R_4(t)$ |
| 5 | $R_5(t)$ |
| . | . |
| . | . |
| . | . |
| N | $R_N(t)$ |

Valve positions are displaced downstream one position for each step, eventually returning to step 1 and recirculating setpoint $R_1(t)$.

A control device D such as a central processing unit (CPU) is interfaced with the flowmeter F and the pump P in conventional fashion. According to this invention, time variable circulation rates $R_N$ appropriate for each step N of the process are encoded, by means of software or otherwise, into or in operable association with the control device D so that an expected or predicted flow rate can be determined for each instant t of time elapsed during a time step interval T. The flowmeter, or associated apparatus, intermittently or continuously compares the actual flow rate detected at a time t with the predicted rate for that time. The control device D reacts to that comparison by adjusting all or selected flow control devices, P, I, X, in the loop L to minimize any difference in the comparison. Both analog or digital control devices are operable, but the logic capabilities of modern microprocessors are more than ample for this purpose. They are thus preferred from the standpoint of cost and versatility.

EXAMPLE I

Figure 3:
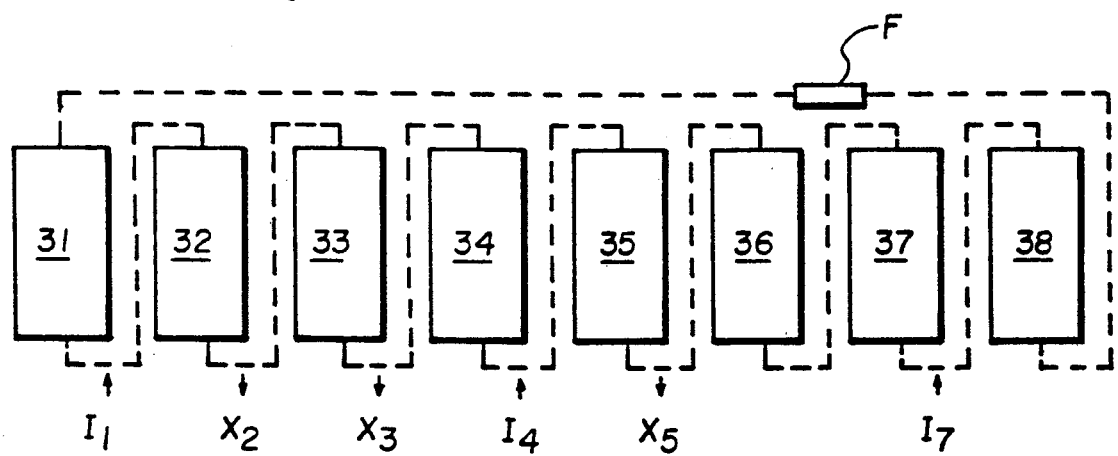
FIG. 3 is a schematic diagram similar to those of FIGS. 1 and 2 configured appropriately for the first step of a specific embodiment of the invention.

The following example is illustrative of one embodiment as illustrated by FIG. 3.

Figure 4:
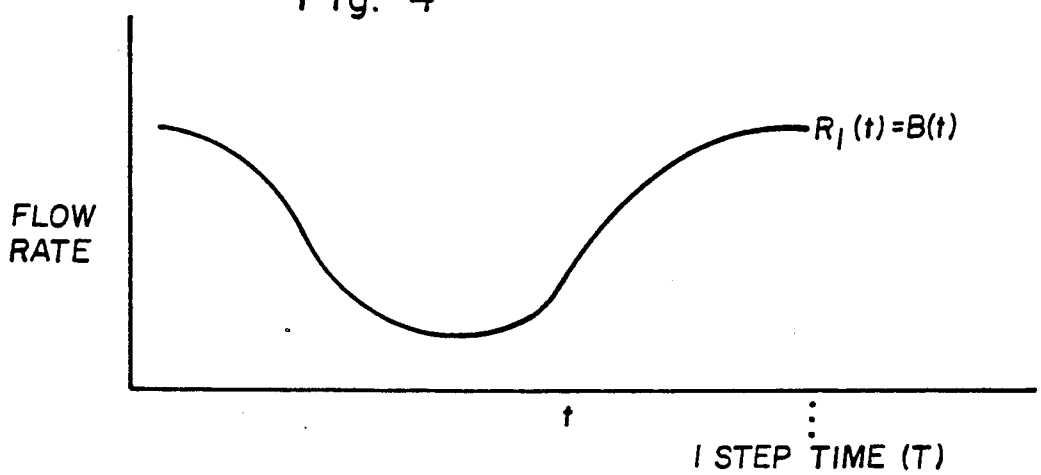
FIGS. 4 through 6 are graphical plots of flow rate functions descriptive of the embodiment illustrated by FIG. 3.
Figure 5:
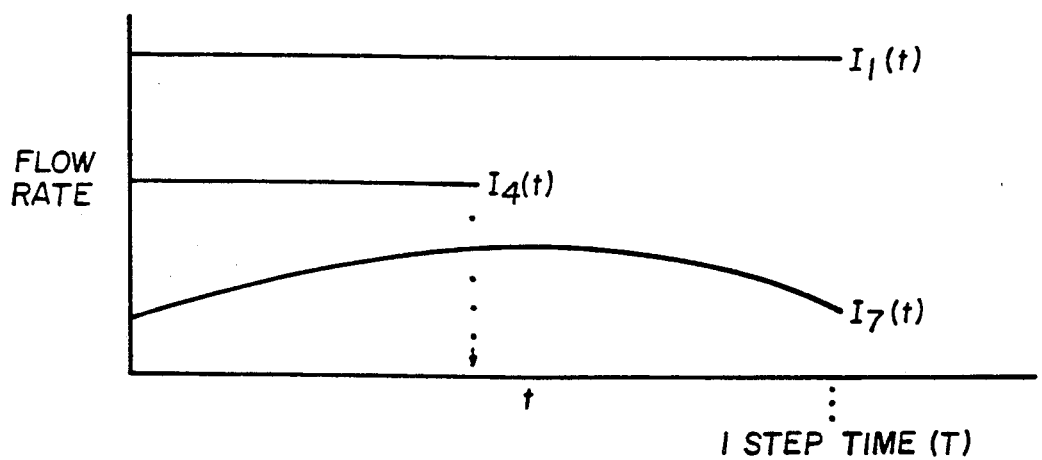
Figure 6:
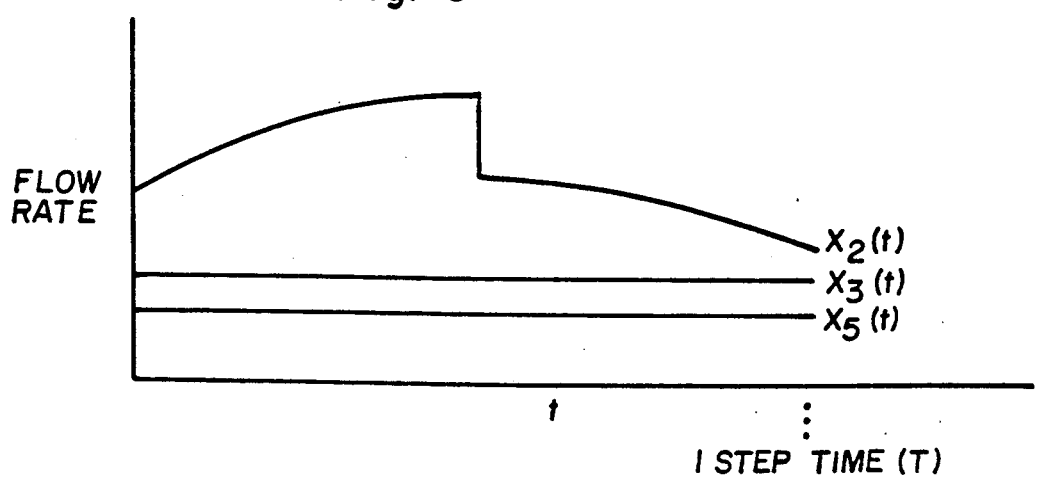

Eight columns 31 through 38, respectively, are configured as in FIG. 3 for step 1 of a process. Three inlets and three outlets are functional in the positions shown. These valve functions are shifted downstream one position each successive step while maintaining the same relative positions with respect to each other. The basic recirculation flow rate function is empirically determined to be as illustrated by FIG. 4, a continuous curve which first moves downward and subsequently upward. The inlet I functions are as illustrated in FIG. 5. Function $I_7(t)$ rises and then subsequently drops. The outlet X flow rate functions are as illustrated by FIG. 6. Outlet $X_2(t)$ follows an upwardly moving rate curve, which then rapidly drops to a reduced value and subsequently drops further. At any instant of time, t, $$I_1(t)+I_4(t)+I_7(t)=X_2(t)+X_3(t)+X_5(t)$$

The internal rates through each column during step 1 are calculated as $$R_1(t)=B(t)$$

$$R_2(t)=R_1(t)+I_1(t)$$

$$R_3(t)=R_2(t)-X_2(t)$$

$$R_4(t)=R_3(t)-X_3(t)$$

$$R_5(t)=R_4(t)+I_4(t)$$

$$R_6(t)=R_5(t)-X_5(t)$$

$$R_7(t)=R_6(t)$$

$$R_8(t)=R_7(t)+I_7(t)$$

Therefore, recirculation rates at flowmeter F are controlled at the time variable rates $R_1(t)$ through $R_8(t)$, respectively, as the process is cycled through steps 1 through 8, respectively.

As with conventional SMB operation, one or more outlet flow rates may need to be increased or decreased slightly during operation to maintain proper internal operating pressure.

EXAMPLE II

A pilot plant system was configured with four columns 41, 42, 43, 44, each packed with an ion exchange resin. FIG. 7 illustrates the configuration with inlet and outlet positions appropriate for step 1. Variable frequency booster pumps P1, P2, P3, P4 provided in the recirculation loop between columns adjusted the recirculation flow rate at the flowmeter F in the recirculation loop between columns 44 and 41. Flow functions were established as follows:

$I_1(t)=127$ ml per minute (42% fructose corn syrup)
$I_3(t)=178$ ml per minute (water)
$X_4(t)=[21.115(t)+30.5]/[1.1+0.06923(t)]$
$X_2(t)=305-X_4(t)$ Outlet 4 delivered high fructose extract and outlet 2 delivered a high glucose raffinate. The recirculation flow for column 1, step 1 was $R_1(t)=B(t)=712$ ml per minute Therefore, the flow rate setpoints for each step were:

| Valve Position Step | Flow Rate Setpoint at F |
| --- | --- |
| 1 | $R_1(t) = 712$ ml/min |
| 2 | $P_2(t) = 839$ ml/min |
| 3 | $R_3(t) = 534 + X_4(t)$ |
| 4 | $R_4(t) = 712 + X_4(t)$ |

The flowmeter F and the pumps P1, P2, P3 and P4 were interfaced with a computer 50 in conventional fashion to maintain the specified flow rates. The outlet flows were slightly increased or decreased from the functional setpoints as required to maintain proper internal pressure.

Operating in this manner yielded a system production rate 22 percent greater than with the identical pilot plant configured for conventional simulated moving bed operation.

EXAMPLE III

The pilot plant system of Example II was operated with the following time variable flow rates:

| | | | |
| --- | --- | --- | --- |
| $I_1(t)$ | = | 92 ml/min t < .496T | (an impure sucrose |
| | | 0 ml/min t ≧ .496T | solution) |
| $I_3(5)$ | = | 644 ml/min t < .496T | (water) |

-continued

| | | |
|---|---|---|
| $X_2(t) =$ | 0 ml/min t ≧ .496T<br>566 ml/min t < .496T<br>0 ml/min t ≧ .496T | (a low purity sucrose solution product) |
| $X_4(t) =$ | 170 ml/min t < .496T<br>0 ml/min t ≧ .496T | (a high purity sucrose solution product) |
| $R_1(t) = B(t) =$ | 10336 ml/min t < .496T<br>10673 ml/min t ≧ .496T | | where T=step time (the time between shifting valve positions downstream).

As in the previous examples, these functions were repeated for each step as the valve positions were displaced around the recirculation loop. The flow rates $R_1$, $R_2$, $R_3$ and $R_4$ were calculated from the step functions and the flow rates were controlled with variable frequency pumps placed in the recirculation line as described in the previous examples The system was also operated as a conventional simulated moving bed for comparison. SMB and TVSMB operation yielded the following respective results:

| | SMB | TVSMB |
|---|---|---|
| Sucrose percent purity at $X_4$ | 92.7 | 94.2 |
| Recovery of sucrose at $X_4$ | 89.9 | 94.9 |

Reference herein to details of the illustrated embodiments is not intended to limit the scope of the appended claims which themselves define the invention.

We claim:

1. In a simulated moving bed process for chromatographically separating differentially sorbent liquid components in which a plurality of sorbent beds are contained within respective separating sections with inlets and outlets connected in a loop so that circulating liquid moves in sequence through said beds while process input streams are cyclically introduced in corresponding sequence to said loop at selected locations associated with said sections, and compensating process output streams are withdrawn in similarly corresponding sequence from said loop at other selected locations associated with said sections, all while maintaining a forward flow in a fixed direction through the loop during a plurality of steps, each said step commencing with the shifting of said input and output streams downstream in said loop, the improvement which comprises:
   establishing within a step a time variable flow rate function for liquid circulating in said loop, whereby to determine the desired flow rates for said liquid at specific instants of time elapsed during a said step to increase one of production rate, component recovery, and component stream purity;
   monitoring said liquid circulating in said loop to detect the actual flow rates of said liquid at said specific instants;
   comparing said detected flow rates with said desired flow rates;
   adjusting the actual flow rate of said liquid in response to said comparisons to maintain said detected flow rates approximately equal to said desired flow rates at subsequent instants of time during said step; and
   repeating said time variable flow rate function in subsequent steps.

2. An improvement according to claim 1 wherein internal circulation rates are determined for locations in said loop alternating with said sections, one said location being positioned immediately upstream in said loop from each said section; said monitoring is done at a specified said location; and said desired flow rates are determined for successive of said steps from said internal circulation rates shifting in sequence at time intervals corresponding to said steps downstream in said loop.

3. An improvement according to claim 1 wherein the actual flow rate is adjusted by means of a flow control device in said loop.

4. An improvement according to claim 3 wherein said flow control device comprises a variable speed pump.

5. An improvement according to claim 3 wherein said flow control device comprises a valve at a said inlet or outlet.

6. An improvement according to claim 3 wherein internal circulation rates are determined for locations in said loop alternating with said sections, one said location being positioned immediately upstream in said loop from each said section; said monitoring is done at a specified said location; and said desired flow rates are determined for successive of said steps from said internal circulation rates shifting in sequence at time intervals corresponding to said steps downstream in said loop.

7. An improvement according to claim 6 wherein said flow control device comprises a variable speed pump.

8. An improvement according to claim 6 wherein said flow control device comprises a valve at a said inlet or outlet.

9. An improvement according to claim 3 wherein said adjustment is effected by a control device operably associated with said flow control device and responsive to said comparing of detected and desired flow rates.

10. An improvement according to claim 3 wherein said monitoring is effected by a flowmeter device, and said flowmeter device is operably associated through a control device with a said flow control device.

11. An improvement according to claim 10 wherein said control device is a computer controller.

12. In a simulated moving bed process for chromatographically separating differentially sorbed liquid components in which a plurality of sorbent beds are contained within respective separating sections with inlets and outlets connected in a loop so that circulating liquid moves in sequence through said beds while process input streams are cyclically introduced in corresponding sequence to said loop at selected locations associated with said sections, and compensating process output streams are withdrawn in similarly corresponding sequence from said loop at other selected locations associated with said sections all while maintaining a forward flow in a fixed direction through the loop during a plurality of steps, each said step commencing with the shifting of said input and output streams downstream in said loop, the improvement which comprises:
   establishing within a step a first time variable flow rate function for liquid circulating in said loop, whereby to determine the desired flow rates for said liquid at specific instants of time elapsed during a said step to increase one of productivity rate, component recovery and component stream purity;
   establishing further time variable flow rate functions for at least two streams of the group of said process input and output streams whereby to determine the desired flow rate for said streams at specific instants of time elapsed during a said step;

monitoring said liquid circulating in said loop to detect the actual flow rates of said circulating liquid at said specific instants;

comparing said detected flow rates with said desired flow rates;

adjusting the actual flow rates of said circulating liquid and said at least two streams of the group of said process input and output streams in response to said comparisons to maintain said detected flow rates approximately equal to said desired flow rates at subsequent instants of time during said step; and repeating said time variable flow rate function in subsequent steps.

13. An improvement according to claim 12 wherein time variable flow rate functions are established for at least one of said process input streams and one of said process output streams whereby to determine the desired flow rate for each said function-established stream at specific instants of time elapsed during said step.

14. An improvement according to claim 12 wherein a time variable flow rate function is established for each process input stream and each process output stream whereby to determine the desired flow rates for each said function-established stream at specific instants of time elapsed during said step.

15. An improvement according to claim 12 wherein said time variable flow rate functions are continuous functions.

16. An improvement according to claim 12 wherein internal circulation rates are determined for locations in said loop alternating with said sections, one said location being positioned immediately upstream in said loop from each said section; said monitoring is done at a specified said location; and said desired flow rates are determined for successive of said steps from said internal circulation rates shifting in sequence at time intervals corresponding to said steps downstream in said loop.

17. An improvement according to claim 12 wherein the actual flow rate is adjusted by means of a flow control device in said loop.

18. An improvement according to claim 17 wherein said flow control device comprises a variable speed pump.

19. An improvement according to claim 17 wherein said flow control device comprises a valve at a said inlet or outlet.

20. An improvement according to claim 17 wherein said adjustment is effected by a control device operably associated with said flow control device and responsive to said comparing of detected and desired flow rates.

21. An improvement according to claim 17 wherein said monitoring is effected by a flowmeter device, and said flowmeter device is operably associated through a control device with a said flow control device.

22. An improvement according to claim 21 wherein said control device is a computer controller.

* * * * *